(12) United States Patent
Chattopadhyay et al.

(10) Patent No.: US 10,491,367 B2
(45) Date of Patent: Nov. 26, 2019

(54) CLOCK AND DATA RECOVERY (CDR) CIRCUIT

(71) Applicant: Synopsys, Inc., Mountain View, CA (US)

(72) Inventors: Biman Chattopadhyay, Karnataka (IN); Ravi Mehta, Karnataka (IN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/278,150

(22) Filed: Feb. 17, 2019

(65) Prior Publication Data

US 2019/0260571 A1 Aug. 22, 2019

(30) Foreign Application Priority Data

Feb. 17, 2018 (IN) .............................. 201841006095

(51) Int. Cl.
*H04L 7/02* (2006.01)
*H04L 7/00* (2006.01)
*H04L 25/03* (2006.01)

(52) U.S. Cl.
CPC .............. *H04L 7/0087* (2013.01); *H04L 7/02* (2013.01); *H04L 25/03* (2013.01)

(58) Field of Classification Search
CPC .......... H04L 7/0087; H04L 25/03; H04L 7/02
See application file for complete search history.

(56) References Cited

U.S. PATENT DOCUMENTS

| | | | | |
|---|---|---|---|---|
| 7,092,472 | B2* | 8/2006 | Stojanovic | ............ H04L 7/0331 375/371 |
| 9,509,319 | B1* | 11/2016 | Chattopadhyay | ..... H03L 7/0807 |
| 9,762,423 | B2 | 9/2017 | Baecher et al. | |
| 2011/0167297 | A1* | 7/2011 | Su | ......................... H04L 7/0054 714/15 |
| 2013/0243071 | A1 | 9/2013 | Chmelar | |

FOREIGN PATENT DOCUMENTS

GB 2453185 A 4/2009

\* cited by examiner

*Primary Examiner* — Dhaval V Patel
(74) *Attorney, Agent, or Firm* — Fenwick & West LLP

(57) ABSTRACT

A clock and data recovery (CDR) circuit receives a data signal and generates a clock signal and a recovered data signal. The CDR circuit includes a clock-recovery circuit (CRC), a sampling phase-recovery circuit (PRC), an analog-to-digital converter (ADC), and a data-recovery circuit (DRC). The CRC receives the data signal and generates an intermediate clock signal. The PRC receives the intermediate clock signal, a sampled data signal and the recovered data signal, and generates the clock signal. The ADC receives the data signal and generates the sampled data signal. The DRC receives the sampled data signal and generates the recovered data signal. The clock signal is phase and frequency synchronized with the data signal.

18 Claims, 6 Drawing Sheets

CLOCK AND DATA RECOVERY (CDR) CIRCUIT

CROSS REFERENCE TO RELATED APPLICATIONS

This application claims the right of priority to India Provisional Application Serial No. 201841006095, entitled "Clock and Data Recovery (CDR) Circuit", filed Feb. 17, 2018, which is incorporated by reference in its entirety.

TECHNICAL FIELD

The present disclosure relates generally to communication systems, and more specifically to clock and data recovery (CDR) circuits.

BACKGROUND

Data communication systems are constantly adapted to serve the ever-increasing need for high-speed data communication. For example, data transmitters of data communication systems have been adapted to transmit multi-level data signals having more than two amplitude levels to increase the transmission capacity of the data transmitter, thereby achieving higher speed for the data communication system.

Typically, to achieve higher speeds, data transmitters transmit the multi-level data signal without an accompanying clock signal. The absence of the accompanying clock signal may result in under-sampling or over-sampling of the multi-level data signal by a data receiver of the data communication system. Further, during long-distance transmission over a lossy communication channel, the multi-level data signal undergoes high attenuation due to noise and inter-symbol interference (ISI). Therefore, data receivers are usually equipped with a CDR circuit that generates a clock signal that is phase and frequency synchronized with the multi-level data signal and correctly detects the amplitude levels of the multi-level data signal by using the generated clock signal.

Some existing CDR circuits require a prior knowledge of the amplitude levels that are used to encode the sequential pairs of bits. When the amplitude levels that are used to encode the sequential pairs of bits are unknown and the multi-level data signal received by the data receiver is highly attenuated, these existing CDR circuits may not operate efficiently and may result in incorrect detection of the amplitude levels of the multi-level data signal.

Similarly, some existing CDR circuits typically operate by detecting transitions (i.e., rising and falling edges) within the multi-level data signal. However, when the multi-level data signal is attenuated by the ISI, a current amplitude level of the multi-level data signal overlaps with a previous amplitude level and anext amplitude level, and hence the transitions within the multi-level data signal may not be accurate. Consequently, these existing CDR circuits detect the amplitude levels of the data signal incorrectly, and are thus not suitable for implementing the data receiver that receives the multi-level data signal. These CDR circuits can cause instability issues in the data receiver that includes an analog-to-digital converter (ADC).

Typically, all communication channels vary in terms of loss profile. Therefore, data receivers require different CDR circuits that are suitable for the loss profile of the corresponding communication channel. Presently, a CDR circuit that operates accurately for all communication channels irrespective of their loss profiles is not available.

SUMMARY

In light of the foregoing, it would be advantageous to have a CDR circuit that generates a clock signal and accurately detects amplitude levels of a multi-level data signal, which are highly attenuated, without requiring a prior knowledge of the amplitude levels. In addition, it will be advantageous to have a single CDR circuit that operates accurately for all types of communication channels having different loss profiles.

The present disclosure describes a combination of components which constitutes a clock and data recovery (CDR) circuit for generating a clock signal for data sampling. The components of the CDR circuit and the method steps performed by the CDR circuit have been represented, showing only specific details that are pertinent for an understanding of the CDR circuit so as not to obscure the disclosure with details that will be readily apparent to those with ordinary skill in the art having the benefit of the description herein. Detailed embodiments are disclosed herein; however, it is to be understood that the disclosed embodiments are merely exemplary, and the CDR circuit can be embodied in various forms. Therefore, specific structural and functional details disclosed herein are not to be interpreted as limiting, but merely as a basis for the claims and as a representative basis for teaching one skilled in the art to variously employ the CDR circuit in virtually any appropriately detailed structure. Further, the terms and phrases used herein are not intended to be limiting but rather to provide an understandable description.

In an embodiment, a clock and data recovery (CDR) circuit is provided. The CDR circuit receives a data signal and generates a clock signal and a recovered data signal. The data signal is a multi-level data signal having multiple amplitude levels. For example, the data signal is a pulse amplitude modulation-4 (PAM-4) signal having four distinct amplitude levels. Each amplitude level represents a distinct pair of bits. For example, the four distinct amplitude levels −3V, −1V, +1V, and +3V of the PAM-4 signal represents "00", "01", "11", and "10", respectively. The CDR circuit includes a clock-recovery circuit (CRC), a phase-recovery circuit (PRC), an analog-to-digital converter (ADC), and a data-recovery circuit (DRC). The CRC receives the data signal and recovers an intermediate clock signal that is phase and frequency synchronized with the data signal. The PRC receives the intermediate clock signal, a sampled data signal, and a recovered data signal. The PRC generates a clock signal by positioning the intermediate clock signal received from the CRC at an accurate sampling position with respect to the data signal. Thus, the PRC achieves an optimum phase relation between the data and clock signals for sampling the data signal $D_{IN}$. The ADC receives the data signal and samples the data signal based on the clock signal from the PRC to generate the sampled data signal. The DRC receives the sampled data signal and generates the recovered data signal.

The CDR circuit accurately generates the clock signal and the recovered data signal for the data signal, even if the data signal is highly attenuated with inter-symbol interference (ISI), without a prior knowledge of the amplitude levels of the data signal. The CDR circuit also operates accurately for communication channels having different loss profiles.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
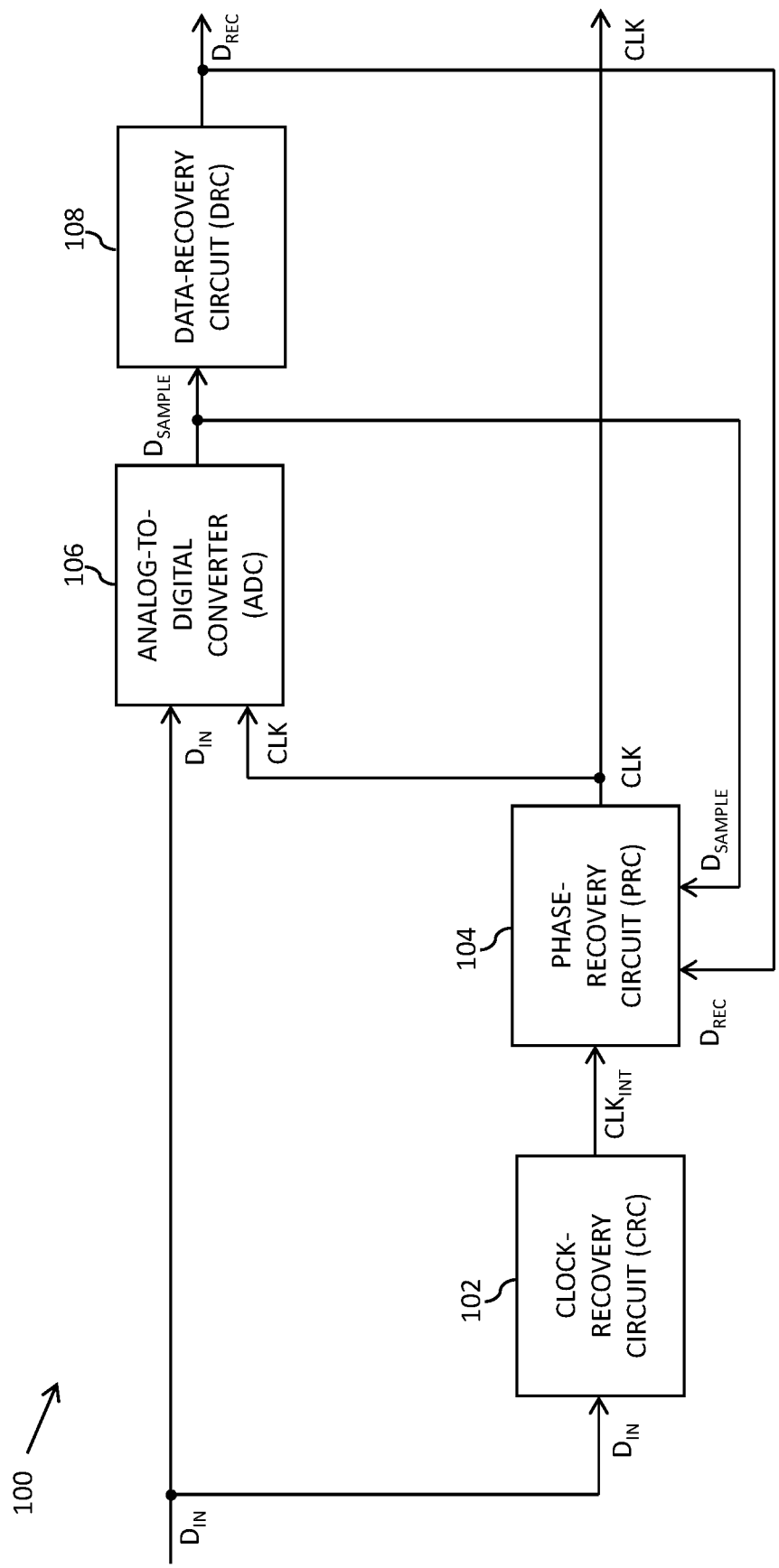
FIG. 1 is a schematic block diagram of a clock and data recovery (CDR) circuit, according to one embodiment.

FIG. 1 is a schematic block diagram of a clock and data recovery (CDR) circuit 100, in accordance with an embodiment. The CDR circuit 100 is implemented in a data receiver (not shown) of a data communication system (not shown). The data receiver receives a data signal $D_{IN}$ from a data transmitter (not shown) of the data communication system. The CDR circuit 100 includes a clock-recovery circuit (CRC) 102, a phase-recovery circuit (PRC) 104, an analog-to-digital converter (ADC) 106, and a data recovery circuit (DRC) 108. The CDR circuit 100 generates a clock signal CLK and uses the clock signal CLK for sampling the data signal $D_{IN}$ to generate a recovered data signal $D_{REC}$. The data signal $D_{IN}$ is a multi-level data signal, such as a pulse amplitude modulation-4 (PAM-4) signal or a non-return-to-zero (NRZ) signal. In one example, the data signal $D_{IN}$ is a PAM-4 signal that has four distinct amplitude levels each representing a sequential pair of bits. For example, the four distinct amplitude levels of the data signal $D_{IN}$ are −3V, −1V, +1V, and +3V representing "00", "01", "11", and "10", respectively. It will be understood by a person skilled in the art that the four amplitude levels may have values other than −3V, −1V, +1V, and +3V.

The CRC 102 receives the data signal $D_{IN}$ from the data transmitter over a communication channel (not shown) and generates an intermediate clock signal $CLK_{INT}$. The intermediate clock signal $CLK_{INT}$ is phase and frequency synchronized with the data signal $D_{IN}$. The CRC 102 is described in detail below in conjunction with FIG. 2.

The PRC 104 is connected to the CRC 102 for receiving the intermediate clock signal $CLK_{INT}$. The PRC 104 further receives a sampled data signal $D_{SAMPLE}$ generated by the ADC 106 and the recovered data signal $D_{REC}$ generated by the DRC 108. The PRC 104 generates the clock signal CLK based on these inputs. In particular, the PRC 104 generates the clock signal CLK by positioning the intermediate clock signal $CLK_{INT}$ at an accurate sampling position based on the sampled data signal $D_{SAMPLE}$ and the recovered data signal $D_{REC}$. In other words, the PRC 104 delays the intermediate clock signal $CLK_{INT}$ based on the sampled and recovered data signals $D_{SAMPLE}$ and $D_{REC}$ to achieve the accurate sampling position for sampling the data signal $D_{IN}$. Thus, the PRC achieves an optimum phase relation between the data signal $D_{IN}$ and the clock signal CLK for sampling the data signal $D_{IN}$. The accuracy of the sampling position may be determined based on jitter in the clock signal. For example, an accurate sampling position has a jitter of no more than 0.3 times the unit interval or bit-period for a given application. If the desired level of accuracy in the sampling position is obtained, the sampled data can be processed (e.g., by feed-forward equalization (FFE) and quantization) to generate the recovered data signal with an acceptable bit error rate (BER). In other embodiments, different levels of jitter are acceptable. The PRC 104 is described in detail below in conjunction with FIG. 3.

The ADC 106 receives the data signal $D_{IN}$ and is connected to the PRC 104 for receiving the clock signal CLK. The ADC 106 samples the data signal $D_{IN}$ based on the clock signal CLK and generates the sampled data signal $D_{SAMPLE}$. The sampled data signal $D_{SAMPLE}$ is a digital signal having a first set of bits. In one example, the sampled data signal $D_{SAMPLE}$ is an 8-bit data signal. The ADC 106 is further connected to the PRC 104 for providing the sampled data signal $D_{SAMPLE}$. The PRC 104 and the ADC 106 form a first feedback loop.

The DRC 108 is connected to the ADC 106 for receiving the sampled data signal $D_{SAMPLE}$. The DRC 108 performs equalization and slicing on the sampled data signal $D_{SAMPLE}$, and generates the recovered data signal $D_{REC}$. The recovered data signal $D_{REC}$ is a digital signal having multiple bits (i.e., a second set of bits) that correspond to the sequential pair of bits represented by the amplitude levels of the data signal $D_{IN}$. The DRC 108 is further connected to the PRC 104 for providing the recovered data signal $D_{REC}$. The PRC 104, the ADC 106, and the DRC 108 form a second feedback loop. The DRC 108 is described in detail below in conjunction with FIG. 4.

In operation, the CRC 102 receives the data signal $D_{IN}$ and generates the intermediate clock signal $CLK_{INT}$ that is phase and frequency synchronized with the data signal $D_{IN}$. The PRC 104 receives the intermediate clock signal $CLK_{INT}$, the sampled data signal $D_{SAMPLE}$, and the recovered data signal $D_{REC}$. Initially, the sampled data signal $D_{SAMPLE}$ and the recovered data signal $D_{REC}$ are at a logic low state. Hence, initially the PRC 104 delays the intermediate clock signal $CLK_{INT}$ by a default delay value to generate the clock signal CLK. The ADC 106 then samples the data signal $D_{IN}$ based on the clock signal CLK and generates the sampled data signal $D_{SAMPLE}$. The DRC 108 generates the recovered data signal $D_{REC}$ having the second set of bits based on the sampled data signal $D_{SAMPLE}$. A count of bits in the second set of bits is less than a count of bits in the first set of bits.

The PRC 104 receives the sampled data signal $D_{SAMPLE}$ and the recovered data signal $D_{REC}$. Based on the sampled and recovered data signals $D_{SAMPLE}$ and $D_{REC}$, the PRC 104 introduces a delay in the position of the intermediate clock signal $CLK_{INT}$ to achieve the accurate sampling position. The intermediate clock signal $CLK_{INT}$ that is positioned at the accurate sampling position represents the clock signal CLK. The ADC 106 then generates the sampled data signal $D_{SAMPLE}$ based on the clock signal CLK, which is both phase and frequency synchronized with the data signal $D_{IN}$, and provides it to the DRC 108. The DRC 108 then generates the recovered data signal $D_{REC}$, which is accurate. The accuracy of the recovered data signal $D_{REC}$ may be measured by bit error rate (BER) of the recovered data signal $D_{REC}$. For example, if $D_{IN}$ is a PAM-4 signal, a BER equal to or less than 1e-4 may be considered acceptable for a given application, so $D_{REC}$ is considered accurate of this BER criterion is met. In other embodiments, a different BER criterion may be used. Since the PRC 104, the ADC 106, and the DRC 108 form two feedback loops, the accuracy of the clock signal CLK and the recovered data signal $D_{REC}$ improves with time.

Figure 2:
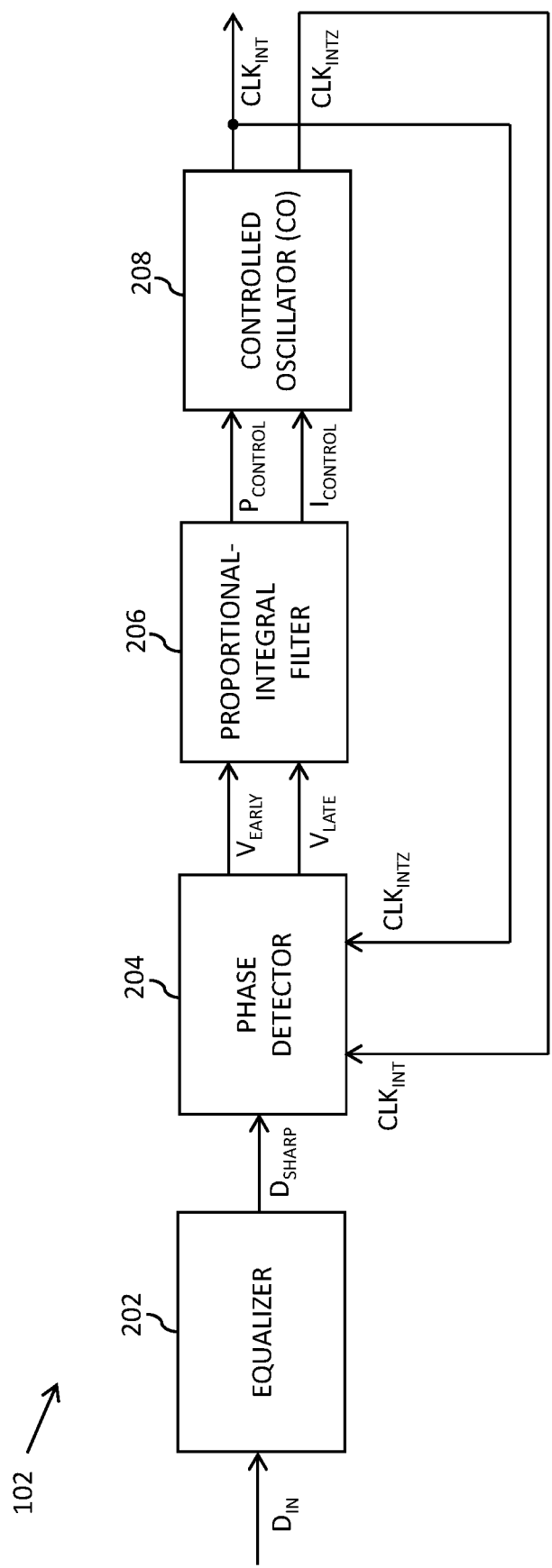
FIG. 2 is a schematic block diagram of a clock-recovery circuit (CRC) of the CDR circuit of FIG. 1, according to one embodiment.

Referring now to FIG. 2, a schematic block diagram of the CRC 102 of the CDR circuit 100 of FIG. 1, in accordance with an embodiment, is shown. The CRC 102 includes an equalizer 202, a phase detector 204, a proportional-integral filter 206, and a controlled oscillator (CO) 208.

The data signal $D_{IN}$ received by the CDR circuit 100 is usually distorted, when the communication channel used for the transmission of the data signal $D_{IN}$ is lossy. The distortion of the data signal $D_{IN}$ results in smoothing of transitions, i.e., rising and falling edges, within the data signal $D_{IN}$. Due to the smoothing, the transitions within the data signal $D_{IN}$ may not be detected accurately. Thus, the CRC 102 includes the equalizer 202, which is an edge-sharpening equalizer, for sharpening the transitions within the data signal $D_{IN}$. The equalizer 202 receives the data signal $D_{IN}$ and sharpens the transitions (i.e., the rising and falling edges) of the data signal $D_{IN}$ to generate an intermediate data signal $D_{SHARP}$. The intermediate data signal $D_{SHARP}$ has sharp rising and falling edges that are used by the phase detector 204 of the CRC 102. The equalizer 202 may implement one or more edge sharpening techniques known in the art for generating the intermediate data signal $D_{SHARP}$.

The phase detector 204 is connected to the equalizer 202 for receiving the intermediate data signal $D_{SHARP}$. The phase detector 204 also receives the intermediate clock signal $CLK_{INT}$ and a complementary intermediate clock signal $CLK_{INTZ}$. The phase detector 204 may be a bang-bang or Alexander phase detector. The phase detector 204 generates early and late voting signals $V_{EARLY}$ and $V_{LATE}$ based on the intermediate data signal $D_{SHARP}$, the intermediate clock signal $CLK_{INT}$, and the complementary intermediate clock signal $CLK_{INTZ}$. The intermediate clock signal $CLK_{INT}$ and the complementary intermediate clock signal $CLK_{INTZ}$ are complementary clock signals. For example, when the intermediate clock signal $CLK_{INT}$ has a rising edge, the complementary intermediate clock signal $CLK_{INTZ}$ has a falling edge.

The phase detector 204 detects occurrence of a transition (i.e., a falling edge or a rising edge) within the intermediate data signal $D_{SHARP}$ based on the intermediate clock signal $CLK_{INT}$. For example, at a rising edge of the intermediate clock signal $CLK_{INT}$, the phase detector 204 samples the intermediate data signal $D_{SHARP}$ and detects the occurrence of the transition within the intermediate clock signal $CLK_{INT}$. When the transition is detected, the phase detector 204 determines whether the transition has occurred before or after a corresponding transition of the complementary intermediate clock signal $CLK_{INTZ}$. Based on the determination whether the transition has occurred before or after the corresponding transition of the complementary intermediate clock signal $CLK_{INTZ}$, the phase detector 204 generates the early and late voting signals $V_{EARLY}$ and $V_{LATE}$. The early and late voting signals $V_{EARLY}$ and $V_{LATE}$ are digital signals having a logic low state (e.g., "0") or a logic high state (e.g., "1"). In one scenario, the early and late voting signals $V_{EARLY}$ and $V_{LATE}$ are at the logic high and logic low states, respectively, when the transition within the intermediate data signal $D_{SHARP}$ has occurred before the corresponding transition of the complementary intermediate clock signal $CLK_{INTZ}$. In another scenario, the early and late voting signals $V_{EARLY}$ and $V_{LATE}$ are at the logic low and logic high states, respectively, when the transition within the intermediate data signal $D_{SHARP}$ has occurred after the corresponding transition of the complementary intermediate clock signal $CLK_{INTZ}$. In yet another scenario, both the early and late voting signals $V_{EARLY}$ and $V_{LATE}$ are at logic low state, when no transition of the intermediate data signal $D_{SHARP}$ has occurred. The proportional-integral filter 206 is connected to the phase detector 204 for receiving the early and late voting signals $V_{EARLY}$ and $V_{LATE}$.

The early and late voting signals $V_{EARLY}$ and $V_{LATE}$ are usually affected by noise. The proportional-integral filter 206 reduces the noise of the early and late voting signals $V_{EARLY}$ and $V_{LATE}$ and generates proportional and integral control signals $P_{CONTROL}$ and $I_{CONTROL}$. The proportional-integral filter 206 includes a proportional path (not shown) and an integral path (not shown). The proportional path generates the proportional control signal $P_{CONTROL}$ and the integral path generates the integral control signal $I_{CONTROL}$, based on the early and late voting signals $V_{EARLY}$ and $V_{LATE}$. The proportional and integral control signals are one of control voltages, control currents, or digital control codes.

The CO 208 is connected to the proportional-integral filter 206 for receiving the proportional and integral control signals $P_{CONTROL}$ and $I_{CONTROL}$. The CO 208 generates the intermediate clock signal $CLK_{INT}$ and the complementary intermediate clock signal $CLK_{INTZ}$. The CO 208 controls frequencies of the intermediate clock signal $CLK_{INT}$ and the complementary intermediate clock signal $CLK_{INTZ}$ based on the proportional and integral control signals $P_{CONTROL}$ and $I_{CONTROL}$. The CO 208 generates the intermediate clock signal $CLK_{INT}$ and the complementary intermediate clock signal $CLK_{INTZ}$ such that the transitions within the intermediate clock signal $CLK_{INT}$ are synchronized with the transitions within the intermediate data signal $D_{SHARP}$. In other words, the intermediate clock signal $CLK_{INT}$ and the complementary intermediate clock signal $CLK_{INTZ}$ are frequency synchronized with the intermediate data signal $D_{SHARP}$, and consequently with the data signal $D_{IN}$. The CO 208 is further connected to the phase detector 204 for providing the intermediate clock signal $CLK_{INT}$ and the complementary intermediate clock signal $CLK_{INTZ}$. As the phase detector 204, the proportional-integral filter 206, and the CO 208 form a feedback loop, frequency synchronization of the intermediate clock signal $CLK_{INT}$ with the intermediate data signal $D_{SHARP}$, and consequently with the data signal $D_{IN}$, improves with time.

In operation, the equalizer 202 receives the data signal $D_{IN}$ and generates the intermediate data signal $D_{SHARP}$. Based on the intermediate data signal $D_{SHARP}$, the intermediate clock signal $CLK_{INT}$, and the complementary intermediate clock signal $CLK_{INTZ}$ and the phase detector 204 generates the early and late voting signals $V_{EARLY}$ and $V_{LATE}$ and provides them to the proportional-integral filter 206. The proportional-integral filter 206 then generates the proportional and integral control voltages $P_{CONTROL}$ and $I_{CONTROL}$ based on the logic states of the early and late voting signals $V_{EARLY}$ and $V_{LATE}$. The CO 208 receives the proportional and integral control voltages $P_{CONTROL}$ and $I_{CONTROL}$ and generates the intermediate clock signal $CLK_{INT}$ and the complementary intermediate clock signal $CLK_{INTZ}$.

Figure 3:
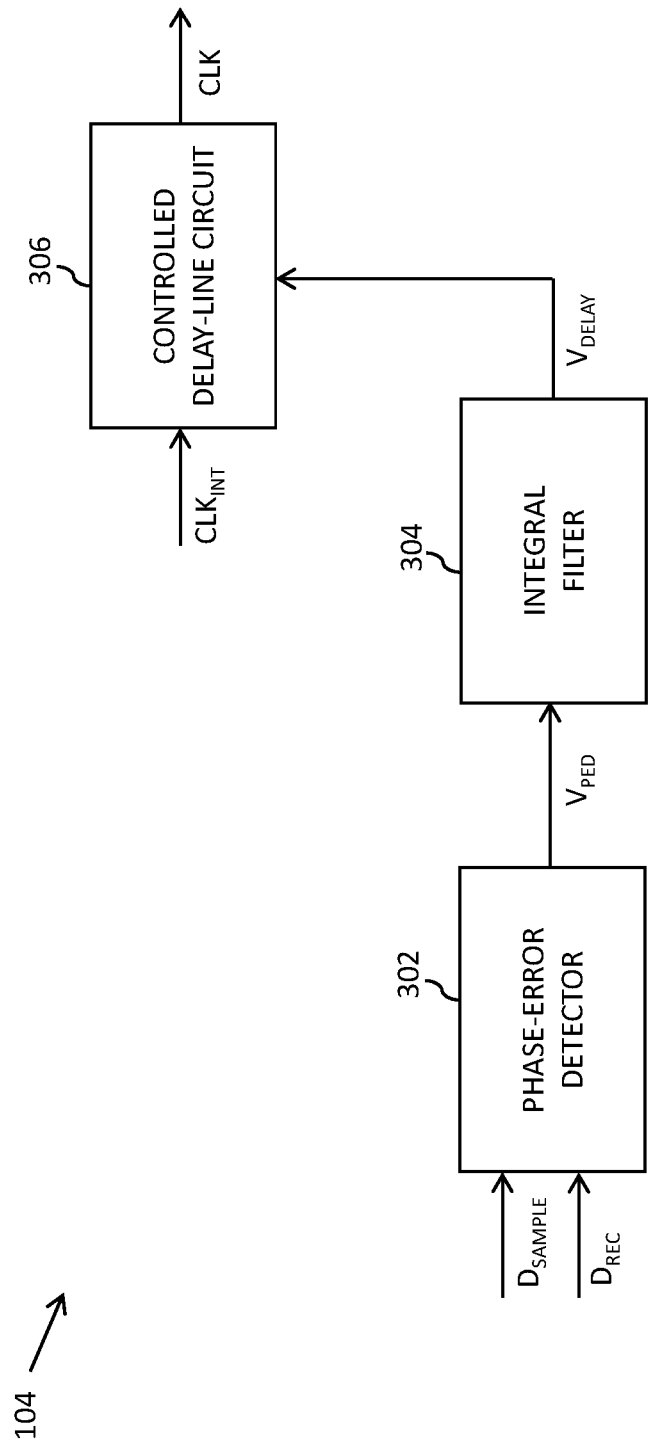
FIG. 3 is a schematic block diagram of a phase-recovery circuit (PRC) of the CDR circuit of FIG. 1, according to one embodiment.

Referring now to FIG. 3, a schematic block diagram of the PRC 104 of the CDR circuit 100 of FIG. 1, in accordance with an embodiment, is shown. The PRC 104 includes a phase-error detector 302, an integral filter 304, and a controlled delay-line circuit 306. The PRC 104 generates the clock signal CLK by positioning the intermediate clock signal $CLK_{INT}$ at the accurate sampling position.

The phase-error detector 302 receives the sampled and recovered data signals $D_{SAMPLE}$ and $D_{REC}$ and generates a phase-error decision signal $V_{PED}$. The phase-error detector 302 may be a Mueller-Muller phase-error detector. The phase-error detector 302 may include a delay circuit (not shown), multipliers (not shown), and subtractors (not shown). The phase-error detector 302 utilizes multiple samples of the sampled and recovered data signals $D_{SAMPLE}$ and $D_{REC}$ in the feedback loop shown in FIG. 1 to balance pre-cursor inter-symbol interference (ISI) with post-cursor ISI in the recovered data signal $D_{REC}$. The post-cursor ISI corresponds to an effect of a previous bit on a current bit of the recovered data signal $D_{REC}$, and the pre-cursor ISI corresponds to an effect of a next bit on the current bit. The phase-error detector 302 may implement Mueller-Muller algorithm or any other algorithm known in the art to generate the phase-error decision signal $V_{PED}$ that meets a predefined criterion for optimum sampling. The phase-error decision signal $V_{PED}$ is at one of a logic high and logic low state.

The integral filter 304 is connected to the phase-error detector 302 for receiving the phase-error decision signal $V_{PED}$. The integral filter 304 integrates the phase-error decision signal $V_{PED}$ and generates a delay control signal $V_{DELAY}$ that represents a multi-bit code for controlling the controlled delay-line circuit 306. In one example, the delay control signal $V_{DELAY}$ represents a 3-bit code having values "000", "001", "010", and the like. It will be understood by a person skilled in the art that the multi-bit code may have any number of bits.

The controlled delay-line circuit 306 is connected to the integral filter 304 for receiving the delay control signal $V_{DELAY}$. The controlled delay-line circuit 306 is further connected to the CRC 102 for receiving the intermediate clock signal $CLK_{INT}$. Initially, the controlled delay-line circuit 306 delays the intermediate clock signal $CLK_{INT}$ by a default delay value to generate the clock signal CLK. Based on the multi-bit code represented by the delay control signal $V_{DELAY}$, the controlled delay-line circuit 306 either advances or delays the intermediate clock signal $CLK_{INT}$ with respect to the default delay value and achieves the accurate sampling position for the intermediate clock signal $CLK_{INT}$. The intermediate clock signal $CLK_{INT}$ at the accurate sampling position is the clock signal CLK. In one example, the controlled delay-line circuit 306 delays the intermediate clock signal $CLK_{INT}$ by a quarter of a bit duration of the data signal $D_{IN}$ when the delay control signal $V_{DELAY}$ is "001", by half of the bit duration when the delay control signal $V_{DELAY}$ is "010", and by three quarters of the bit duration when the delay control signal $V_{DELAY}$ is "011". The controlled delay-line circuit 306 further advances the intermediate clock signal $CLK_{INT}$ by a quarter of the bit duration when the delay control signal $V_{DELAY}$ is "101", by half of the bit duration when the delay control signal $V_{DELAY}$ is "110", and by three quarters of the bit duration when the delay control signal $V_{DELAY}$ is "111". The controlled delay-line circuit 306 may not delay or advance the intermediate clock signal $CLK_{INT}$ when the delay control signal $V_{DELAY}$ is "000". The controlled delay-line circuit 306 provides the clock signal CLK to the ADC 106.

In operation, the phase-error detector 302 generates the phase-error decision signal $V_{PED}$ based on the sampled and recovered data signals $D_{SAMPLE}$ and $D_{REC}$ and provides it to the integral filter 304. In one example, the phase-error decision signal $V_{PED}$ is at the logic low state. The integral filter 304 receives the phase-error decision signal $V_{PED}$ and generates the delay control signal $V_{DELAY}$. In one scenario, the delay control signal $V_{DELAY}$ is "010". The controlled delay-line circuit 306 receives the delay control signal $V_{DELAY}$ (i.e., "010") and delays the intermediate clock signal $CLK_{INT}$ by half of the bit duration to generate the clock signal CLK. The clock signal CLK is thus frequency and phase synchronized with the data signal $D_{IN}$. The ADC 106 receives the clock signal CLK and generates the sampled data signal $D_{SAMPLE}$ based on the clock signal CLK.

Figure 4:
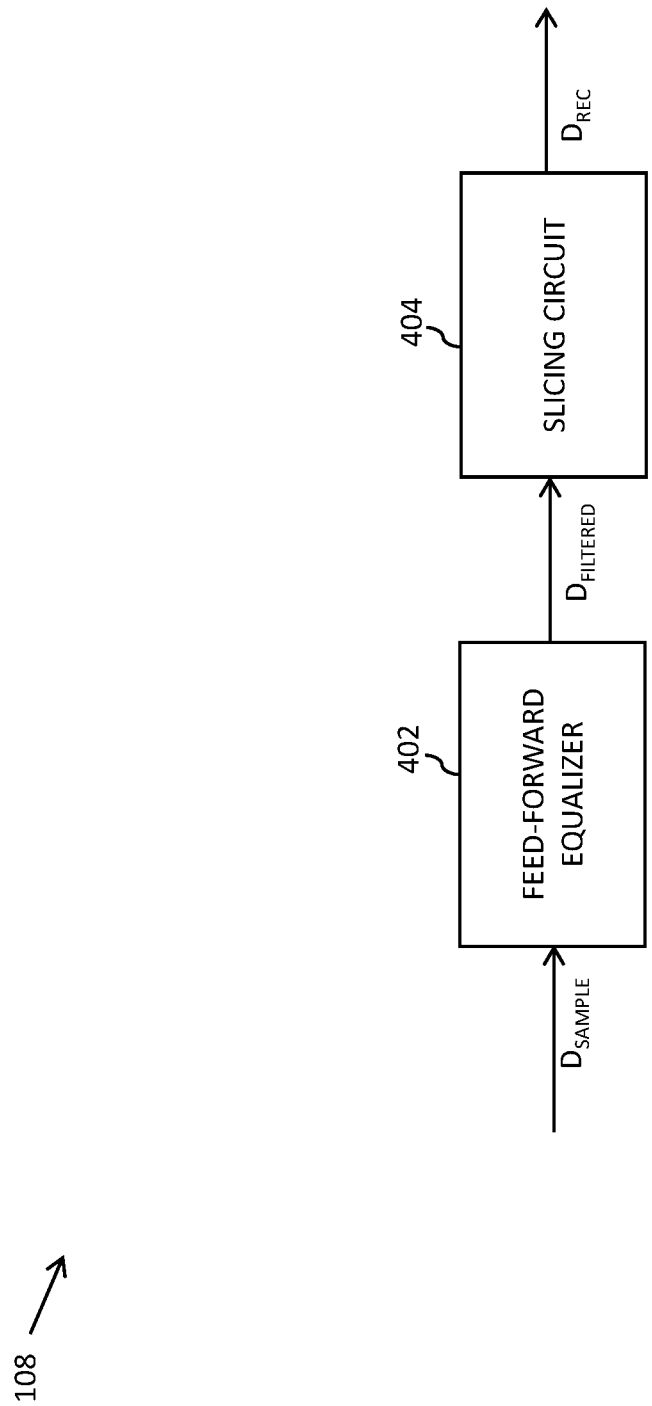
FIG. 4 is a schematic block diagram of a data-recovery circuit (DRC) of the CDR circuit of FIG. 1, according to one embodiment.

Referring now to FIG. 4, a schematic block diagram of the DRC 108 of the CDR circuit 100 of FIG. 1, in accordance with an embodiment, is shown. The DRC 108 includes a feed-forward equalizer 402 and a slicing circuit 404.

The feed-forward equalizer 402 is connected to the ADC 106 for receiving the sampled data signal $D_{SAMPLE}$ and generates a filtered data signal $D_{FILTERED}$. The feed-forward equalizer 402 generates the filtered data signal $D_{FILTERED}$ by cancelling the ISI in the sampled data signal $D_{SAMPLE}$. In one example, the feed-forward equalizer 402 is a finite impulse response equalizer. The feed-forward equalizer 402 implements one or more equalization techniques known in the art for cancelling the ISI in the sampled data signal $D_{SAMPLE}$.

The slicing circuit 404 is connected to the feed-forward equalizer 402 for receiving the filtered data signal $D_{FILTERED}$. The slicing circuit 404 quantizes the filtered data signal $D_{FILTERED}$ to generate the recovered data signal $D_{REC}$. The recovered data signal $D_{REC}$ is a digital signal and includes the sequential pair of bits that are represented by the amplitude levels of the data signal $D_{IN}$. For example, when the amplitude levels of the data signal $D_{IN}$ are −3V, 1V, +1V, and +3V, the recovered data signal $D_{REC}$ includes the sequential pairs of bits "00", "01", "11", and "10", respectively. In other words, the DRC 108 reduces the first set of bits of the sampled data signal $D_{SAMPLE}$ to the second set of bits.

Thus, the CDR circuit 100 accurately generates the clock signal CLK and the recovered data signal $D_{REC}$ from the data signal $D_{IN}$, where the data signal $D_{IN}$ is a multi-level signal. The CDR circuit 100 successfully operates with multi-level data signals attenuated with ISI without requiring prior knowledge of the amplitude levels of the multi-level data signals, such as the data signal $D_{IN}$. In addition, the CDR circuit 100 is suitable to operate for various communication channels having different loss profiles.

Overview of Electronic Design Automation Design Flow

Figure 5:
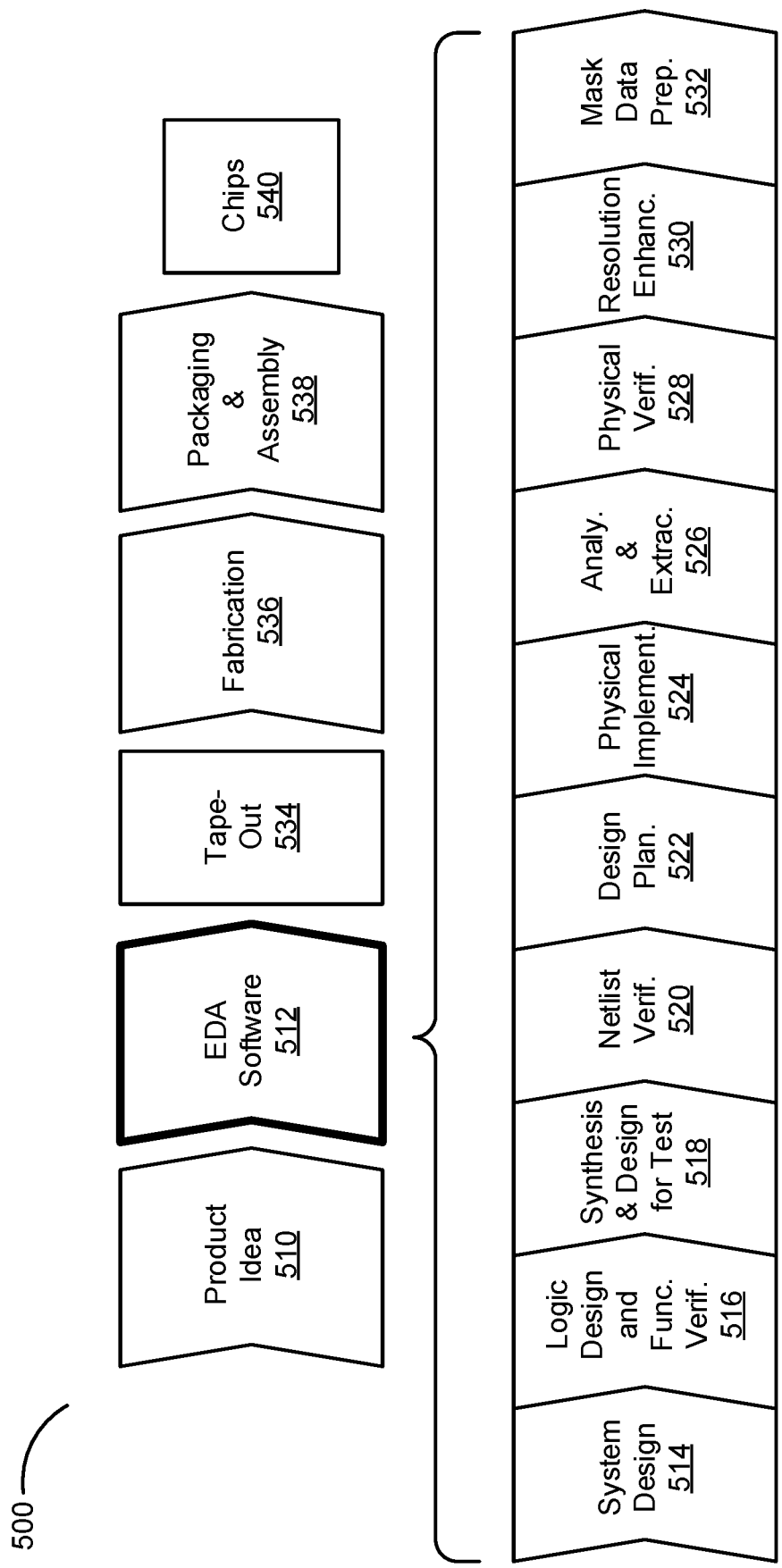
FIG. 5 is a flowchart illustrating the various operations in the design and fabrication of an integrated circuit, according to one embodiment.

FIG. 5 is a flowchart 500 illustrating the various operations in the design and fabrication of an integrated circuit. This process starts with the generation of a product idea 510, which is realized during a design process that uses electronic design automation (EDA) software 512. When the design is finalized, it can be taped-out 534. After tape-out, a semiconductor die is fabricated 536 to form the various objects (e.g., a CRC, 102, a PRC 104, an ADC 106, and a DRC 108) in the integrated circuit design. Packaging and assembly processes 538 are performed, which result in finished chips 540.

The EDA software 512 may be implemented in one or more computing devices including a memory. An example of a memory is a non-transitory computer readable storage medium. For example, the EDA software 512 is stored as instructions in the computer-readable storage medium which are executed by a processor for performing operations 514-532 of the design flow, which are described below. This design flow description is for illustration purposes. In particular, this description is not meant to limit the present disclosure. For example, an actual integrated circuit design may require a designer to perform the design operations in a difference sequence than the sequence described herein.

A cell library incorporating one or more circuits as described above with reference to FIGS. 1 through 4 may be stored in the memory, e.g., the non-transitory computer readable medium. The cell library may be referenced by the EDA software 512 to create a circuit or electronic device incorporating the NVM bitcells or circuits.

During system design 514, designers describe the functionality to implement. They can also perform what-if planning to refine the functionality and to check costs. Note that hardware-software architecture partitioning can occur at this stage. During logic design and functional verification 516, VHDL or Verilog code for modules in the circuit is written and the design is checked for functional accuracy. More specifically, the design is checked to ensure that it produces the correct outputs. During synthesis and design for test 518, VHDL/Verilog is translated to a netlist. This netlist can be optimized for the target technology. Additionally, tests can be designed and implemented to check the finished chips. During netlist verification 520, the netlist is checked for compliance with timing constraints and for correspondence with the VHDL/Verilog source code.

During design planning 522, an overall floor plan for the chip is constructed and analyzed for timing and top-level routing. Example EDA software products from Synopsys, Inc. of Mountain View, Calif. that can be used at this stage include: Astro® and IC Compiler® products. During physical implementation 524, the placement (positioning of circuit elements) and routing (connection of the same) occurs. During analysis and extraction 526, the circuit function is verified at a transistor level, which permits refinement. During physical verification 528, the design is checked to ensure correctness for: manufacturing, electrical issues, lithographic issues, and circuitry. During resolution enhancement 530, geometric manipulations of the layout are performed to improve manufacturability of the design. During mask-data preparation 532, the 'tape-out' data for production of masks to produce finished chips is provided.

Embodiments of the present disclosure can be used during one or more of the above-described stages. Specifically, in some embodiments the present disclosure can be used in EDA software 512 that includes operations between design planning 522 and physical implementation 524.

Figure 6:
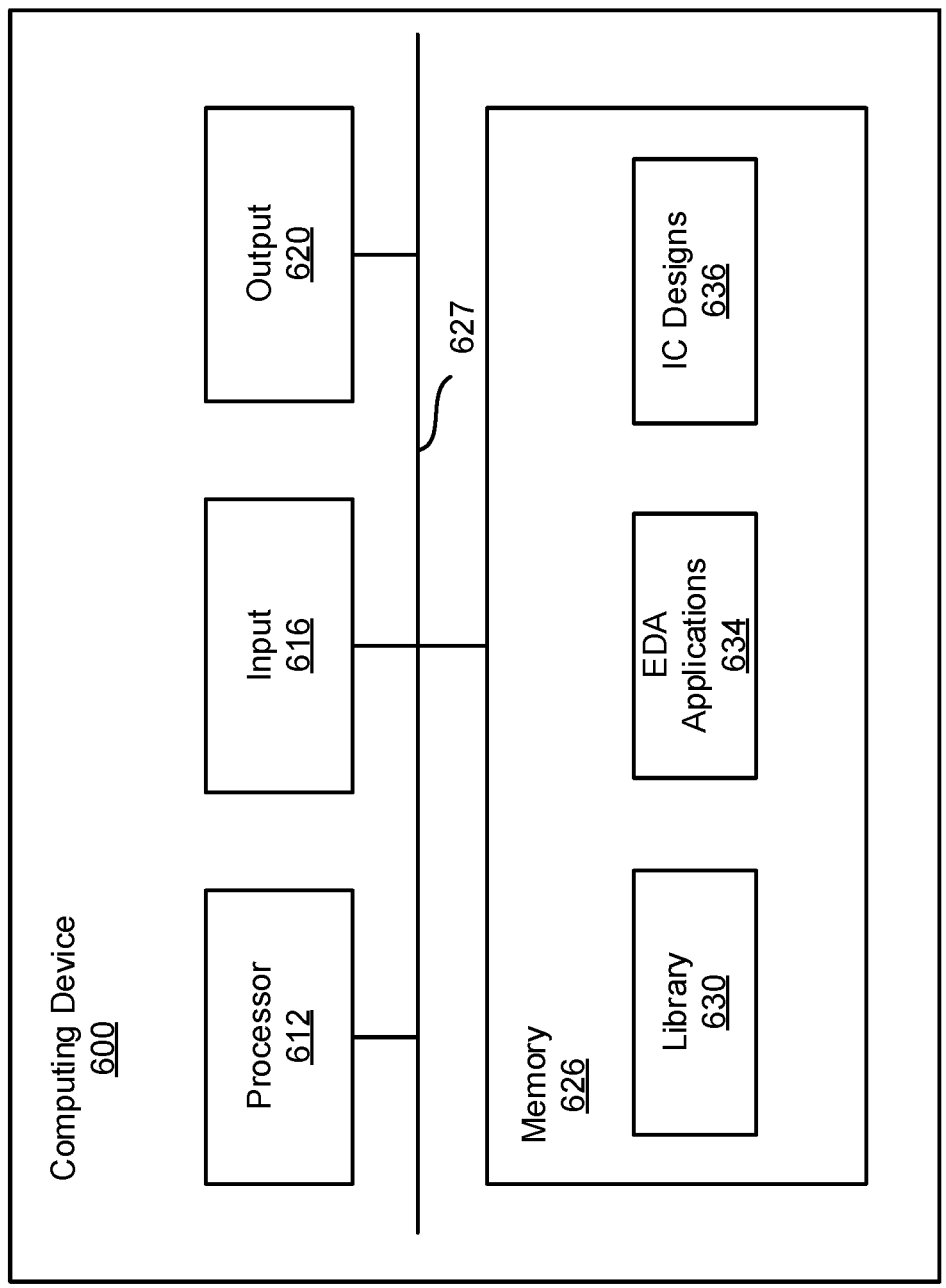
FIG. 6 is a block diagram of a computing device for designing a circuit, according to one embodiment.

FIG. 6 is a block diagram of a computing device 600 for performing designing operations associated with communications circuits including the CDR circuit described in relation to FIGS. 1 through 4. The computer device 600 may include, among other components, a processor 612, an input module 616, an output module 620, a memory 626 and a bus 627 for connecting these components. The processor 612 executes instructions stored in the memory 626. The input module 616 may include various devices for receiving user input, including keyboards and pointing devices (e.g., mouse and touch screen). The output module 620 includes a display device or interface device for communicating with the display device.

The memory 626 is a non-transitory computer readable storage medium storing, among others, library 630, electronic design automation (EDA) applications 634 and integrated circuit (IC) designs 636. The library 630 may include data on various circuit components, including instances of the CDR circuit and sub-components describe herein. The EDA applications 634 may include various software programs for designing ICs, including place and route tools, synthesis tools, and verification tools. The design processed by the EDA applications 634 may be stored in IC designs 636. The IC designs 636 may be an entire operational circuit or a part of a larger IC circuit.

The terms logic high and low states have been used herein to distinguish before high and low signals. For example, the logic low state could signify a signal that is 0V while a logic high state would then indicate a signal that has a logical '1' value, with the actual voltage value for logic 1 depending on circuit technology. The circuits described herein can also be designed using either positive or negative logic.

While various embodiments have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A clock and data recovery (CDR) circuit comprising:
   a clock-recovery circuit (CRC) configured to receive an input data signal and generate an intermediate clock signal based on the input data signal, wherein the intermediate clock signal is phase and frequency synchronized with the input data signal;
   a phase-recovery circuit (PRC) configured to receive the intermediate clock signal from the CRC and delay the intermediate clock signal based on a recovered data signal and a sampled data signal to generate a clock signal;
   an analog-to-digital converter (ADC) configured to sample the input data signal based on the clock signal to generate the sampled data signal; and
   a data-recovery circuit (DRC) configured to receive the sampled data signal and generate the recovered data signal based on the sampled data signal.

2. The CDR circuit of claim 1, wherein the CRC comprises:
   an equalizer configured to sharpen transitions within the input data signal to generate an intermediate data signal; and
   a phase detector configured to receive the intermediate clock signal and to generate voting signals based on timing of transitions in the intermediate data signal relative to transitions in the intermediate clock signal.

3. The CDR circuit of claim 2, wherein the CRC further comprises:
   a proportional-integral filter configured to receive the voting signals from the phase detector and reduce noise in the voting signals to generate control signals; and
   a controlled oscillator configured to receive the control signals from the proportional-integral filter and control a frequency of the intermediate clock signal based on the control signals.

4. The CDR circuit of claim 1, wherein the PRC comprises:
- a phase-error detector configured to receive multiple samples of the sampled data signal and the recovered data signal and generate a phase-error decision signal based on the multiple samples;
- an integral filter configured to receive the phase-error decision signal and generate a delay control signal based on the phase-error decision signal; and
- a controlled delay-line circuit configured to receive the delay control signal and the intermediate clock signal, and to generate the clock signal by advancing or delaying the intermediate clock signal according to the delay control signal.

5. The CDR circuit of claim 1, wherein the DRC comprises:
- a feed-forward equalizer configured to filter the sampled data signal to cancel inter-signal interference (ISI) in the sampled data signal; and
- a slicing circuit configured to quantize the filtered sampled data signal to generate the recovered data signal.

6. The CDR circuit of claim 1, wherein the input data signal is a multi-level data signal having a plurality of amplitude levels, and the CDR circuit generates the recovered data signal without prior access to the amplitude levels.

7. A non-transitory computer-readable storage medium storing a digital representation of a clock and data recovery (CDR) circuit comprising:
- a clock-recovery circuit (CRC) configured to receive an input data signal and generate an intermediate clock signal based on the input data signal, wherein the intermediate clock signal is phase and frequency synchronized with the input data signal;
- a phase-recovery circuit (PRC) configured to receive the intermediate clock signal from the CRC and delay the intermediate clock signal based on a recovered data signal and a sampled data signal to generate a clock signal;
- an analog-to-digital converter (ADC) configured to sample the input data signal based on the clock signal to generate the sampled data signal; and
- a data-recovery circuit (DRC) configured to receive the sampled data signal and generate the recovered data signal based on the sampled data signal.

8. The non-transitory computer-readable storage medium of claim 7, wherein the CRC comprises:
- an equalizer configured to sharpen transitions within the input data signal to generate an intermediate data signal; and
- a phase detector configured to receive the intermediate clock signal and to generate voting signals based on timing of transitions in the intermediate data signal relative to transitions in the intermediate clock signal.

9. The non-transitory computer-readable storage medium of claim 8, wherein the CRC further comprises:
- a proportional-integral filter configured to receive the voting signals from the phase detector and reduce noise in the voting signals to generate control signals; and
- a controlled oscillator configured to receive the control signals from the proportional-integral filter and control a frequency of the intermediate clock signal based on the control signals.

10. The non-transitory computer-readable storage medium of claim 7, wherein the PRC comprises:
- a phase-error detector configured to receive multiple samples of the sampled data signal and the recovered data signal and generate a phase-error decision signal based on the multiple samples;
- an integral filter configured to receive the phase-error decision signal and generate a delay control signal based on the phase-error decision signal; and
- a controlled delay-line circuit configured to receive the delay control signal and the intermediate clock signal, and to generate the clock signal by advancing or delaying the intermediate clock signal according to the delay control signal.

11. The non-transitory computer-readable storage medium of claim 7, wherein the DRC comprises:
- a feed-forward equalizer configured to filter the sampled data signal to cancel inter-signal interference (ISI) in the sampled data signal; and
- a slicing circuit configured to quantize the filtered sampled data signal to generate the recovered data signal.

12. The non-transitory computer-readable storage medium of claim 7, wherein the input data signal is a multi-level data signal having a plurality of amplitude levels, and the CDR circuit generates the recovered data signal without prior access to the amplitude levels.

13. A method for clock and data recovery comprising:
- receiving an input data signal;
- generating, by a clock recovery circuit (CRC), an intermediate clock signal based on the input data signal, wherein the intermediate clock signal is phase and frequency synchronized with the input data signal;
- delaying, by a phase-recovery circuit (PRC), the intermediate clock signal based on a recovered data signal and a sampled data signal to generate a clock signal;
- sampling, by an analog-to-digital converter (ADC), the input data signal based on the clock signal to generate the sampled data signal; and
- generating, by a data-recovery circuit (DRC), the recovered data signal based on the sampled data signal.

14. The method of claim 13, wherein generating the intermediate clock signal comprises:
- sharpening transitions within the input data signal to generate an intermediate data signal; and
- generating voting signals based on timing of transitions in the intermediate data signal relative to transitions in the intermediate clock signal.

15. The method of claim 14, wherein generating the intermediate clock signal further comprises:
- reducing noise in the voting signals to generate control signals; and
- controlling a frequency of the intermediate clock signal based on the control signals.

16. The method of claim 13, wherein delaying the intermediate clock signal comprises:
- receiving multiple samples of the sampled data signal and the recovered data signal;
- generating a phase-error decision signal based on the multiple samples;
- generating a delay control signal based on the phase-error decision signal; and
- generating the clock signal by advancing or delaying the intermediate clock signal according to the delay control signal.

17. The method of claim 13, wherein generating the recovered data signal comprises:
- filtering the sampled data signal to cancel inter-signal interference (ISI) in the sampled data signal; and
- quantizing the filtered sampled data signal to generate the recovered data signal.

18. The method circuit of claim 13, wherein the input data signal is a multi-level data signal having a plurality of amplitude levels, and the recovered data signal is generated without prior access to the amplitude levels.

* * * * *